United States Patent
Tsuda et al.

(10) Patent No.: US 7,146,728 B2
(45) Date of Patent: Dec. 12, 2006

(54) METHOD FOR SELECTING MATERIAL FORMING INK CHANNEL IN INK-JET RECORDING

(75) Inventors: Masashi Tsuda, Aichi-ken (JP); Noriaki Satoh, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 100 days.

(21) Appl. No.: 10/946,124

(22) Filed: Sep. 22, 2004

(65) Prior Publication Data

US 2005/0116984 A1 Jun. 2, 2005

(30) Foreign Application Priority Data

Sep. 24, 2003 (JP) ............................. 2003-331982

(51) Int. Cl.
*B21D 53/76* (2006.01)
*B41J 2/015* (2006.01)
(52) U.S. Cl. ................... 29/890.1; 29/890.09; 347/20
(58) Field of Classification Search ............... 29/890.1, 29/890.09; 347/20, 40, 47, 29, 100; 264/340, 264/341, 344, 345, 346, 347, 233; 106/31.86, 106/31.65, 31.59
See application file for complete search history.

(56) References Cited

U.S. PATENT DOCUMENTS 5,182,579 A * 1/1993 Haruta et al. ................. 347/87
5,936,649 A * 8/1999 Ikeda et al. ................... 347/87
6,547,381 B1 * 4/2003 Watanabe et al. ........... 347/100
2003/0107625 A1 6/2003 Koga

FOREIGN PATENT DOCUMENTS

JP  B2-2658034  6/1997
JP  A-2003-175631  6/2003

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A method for selecting a resin or rubber material to construct an ink flow passage of an ink-jet recording apparatus includes immersing the resin or rubber material in water at 60° C. for 2 weeks in a tightly closed vessel, and determining an amount of eluted fatty acid derivative. If the amount of fatty acid derivative is not more than 20 ppm with respect to a total amount of the resin or rubber material, it is judged that the resin or rubber material is appropriate as the material for the ink flow passage. It is possible to select, by the convenient method, the material which is most suitable for the actual condition of use, without examining components and compositions of respective materials.

14 Claims, 3 Drawing Sheets

METHOD FOR SELECTING MATERIAL FORMING INK CHANNEL IN INK-JET RECORDING

BACKGROUND OF THE INVENTION

1. Field of the Invention

The present invention relates to a method for selecting a material which is preferably usable to construct an ink flow passage of an ink-jet recording apparatus so that the high reliability and the high image quality are stably obtained not only when the material is in the initial state in which the ink flow passage of the ink-jet recording apparatus is filled with the ink but also when the material undergoes the temperature change and/or the time-dependent change.

2. Description of the Related Art

Those known as the ink-jet recording system include, for example, the bubble system in which the ink is discharged from minute nozzles by the aid of bubbles generated by the sudden heating, and the piezoelectric system in which the ink is discharged from minute nozzles by using the piezoelectric element which is deformed in accordance with the voltage application. In this printing technique, the inks of several colors as basic colors are converted into minute liquid droplets of several picoliters to several tens picoliters which are selectively landed on the paper surface so that an image is formed thereby. In recent years, it has been investigated to miniaturize the ink-jet recording apparatus. For example, U.S. 2003/0107625 A1 (Japanese Patent Application Laid-open No. 2003-175631) discloses an apparatus in which an ink-retaining section for retaining the ink is provided separately from a head, and the ink is supplied from the ink-retaining section through a tube to the head.

The ink-jet recording system is advantageous in the high printing quality of letters and the high printing quality of images owing to the discharge control of the minute liquid droplets, wherein the minute liquid droplets of several picoliters are landed onto the paper surface highly accurately, and thus it is possible to form the image which has no granular texture and which possesses the color reproduction approximate to the full color. In order to make it possible to discharge the minute liquid droplets as described above, it is necessary to adopt a technique for highly accurately control the landing from the sufficiently thin discharge nozzles. In order to make it possible to effect the precise ink discharge as described above, it is necessary to avoid any contamination of foreign matters which inhibit the flow of the ink in the ink flow passage in the apparatus. Therefore, the contamination of foreign matters is intended to be avoided, for example, as follows. That is, the ink flow passage is assembled and the ink is produced in the clean room, and the ink, which has been subjected to the precise filtration through a membrane filter of 0.2 µm, is used.

In general, a resin or rubber material, which is cheap and easily processible, is used as the material for constructing the ink flow passage of the ink-jet recording apparatus. Usually, such a resin or rubber material contains many additives other than the major component. The additives include, for example, stabilizers such as stannum compounds, fatty acid calcium salts, and phosphorous acid esters to avoid the qualitative deterioration caused by the heat during the molding; fillers such as glass, silica, and metal powders to improve, for example, the heat resistance and the abrasion resistance; ultraviolet-absorbing agents such as 2-hydroxybenzophenone, triazole, and acrylonitrile derivatives to avoid the deterioration of the strength caused by the ultraviolet light; flame retardants such as antimony oxide, barium metaborate, and phosphate esters to improve the flame resistance; plasticizers such as phthalic diesters, dioctyl phthalate, and butanol diesters to adjust the processibility; antioxidants to avoid the deterioration of the strength caused by the air oxidation; antistatic agents such as fatty acid glycerides including, for example, stearic monoglyceride and palmitic monoglyceride to avoid the accumulation of static electricity; coloring agents; and mold releasing agents. Further, any reaction catalyst, which is represented by the chlorine-based catalyst containing carbon tetrachloride, is necessarily used especially for those produced by the ionic polymerization method, such as polyethylene and polypropylene included in the resin or rubber materials. When the chlorine-based catalyst is used as described above, it is necessary to add a neutralizing agent in order that the mold is not corroded during the molding. Fatty acid derivatives such as calcium stearate are used most generally as the neutralizing agent.

Those having the property to be eluted into water are included in the additives as described above. Therefore, even when the ink flow passage is assembled and the ink is produced in the clean room, the clean state can be maintained only at the initial stage at which the ink flow passage is filled with the ink. If the temperature change and/or the time-dependent change occurs in the state in which the ink flow passage is filled with the ink, then the additive is eluted from the resin or rubber material which is used for the ink flow passage, the reaction or the like is caused together with the component contained in the ink, and any insoluble matter is produced in some cases. When such an insoluble matter is produced, a problem arises such that the nozzles are clogged up, the highly accurate ink discharge is not achieved, and the image quality is consequently lowered.

As a technique to solve the problem as described above, Japanese Patent No. 2658034 discloses an ink container in which the content of fatty acid or fatty acid derivative is not more than 100 ppm. However, when the content of fatty acid or fatty acid derivative in the material for the ink container is not more than 100 ppm, the margin for selecting the material is extremely narrowed, which is not practical. Further, according to an experiment performed by the inventors, the discharge failure, which was considered to be caused by the elution of fatty acid or fatty acid derivative, occurred in some cases, although the material, in which the content of fatty acid or fatty acid derivative was about 50 ppm, was used.

SUMMARY OF THE INVENTION

The present invention has been made in order to solve the problems as described above, a first object of which is to provide a method for selecting a material which is preferably usable to construct an ink flow passage of an ink-jet recording apparatus wherein the high reliability and the high image quality are stably obtained not only when the material is in the initial state in which the ink flow passage is filled with the ink but also when the material undergoes the temperature change and/or the time-dependent change. A second object of the present invention is to provide a novel method for evaluating and selecting a material extremely conveniently to construct an ink flow passage of an ink-jet recording apparatus without analyzing the composition by using any expensive instrument for analysis.

According to the present invention, there is provided a method for selecting a resin or rubber material to be used for at least a part of an ink flow passage of an ink-jet recording apparatus; the method comprising immersing the resin or rubber material in heated water or a heated ink to be used for the ink-jet recording apparatus, for a predetermined period of time in a tightly closed vessel; determining an amount of eluted matters eluted into the water or the ink after the immersing of the resin or rubber material; and judging whether or not the resin or rubber material is appropriate as the material to be used for at least the part of the ink flow passage of the ink-jet recording apparatus on the basis of the determined amount of the eluted matters, whereby the resin or rubber material to be used for at least the part of the ink flow passage of the ink-jet recording apparatus is selected. It may be judged that the resin or rubber material is appropriate as the material to be used for at least the part of the ink flow passage of the ink-jet recording apparatus only when the determined amount of the eluted matters is not more than a predetermined amount. The eluted matters may include fatty acid derivative such as calcium stearate.

In the method of the present invention, when the resin or rubber material is immersed in the water at 60° C. for 2 weeks in the tightly closed vessel, it may be judged that the resin or rubber material is appropriate as the material to be used for at least the part of the ink flow passage of the ink-jet recording apparatus, if an amount of fatty acid derivative, which is eluted into the water, is not more than 20 ppm with respect to a total amount of the resin or rubber material. When the resin or rubber material is immersed in the ink at 60° C. for 2 weeks in the tightly closed vessel, then the ink after the immersion may be filtrated to determine a filtration time, and the amount of the eluted matters eluted into the ink may be determined on the basis of the filtration time. In this procedure, the ink may be retained at 60° C. for 2 weeks in the tightly closed vessel without immersing the resin or rubber material, a reference filtration time may be subsequently determined by filtrating the ink, and the amount of the eluted matters eluted into the ink may be determined by comparing the reference filtration time with the filtration time obtained when the resin or rubber material is immersed in the ink.

As a result of diligent investigations performed by the inventors, it has been found out that the amount of the eluted matters such as fatty acid derivatives eluted into the ink not necessarily depends on the contents of additives such as fatty acid derivatives contained in the resin or rubber material. For example, the following fact has been revealed by an experiment performed by the inventors. That is, the additive, which is included in the additives contained in the resin or rubber material and which most greatly affects the stable discharge of the ink from the nozzles, is the fatty acid derivative such as fatty acid salts added as the stabilizer, the antistatic agent, and the neutralizing agent. However, the inventors have found out the fact that the fatty acid derivative is scarcely eluted from the resin or rubber material in some cases, even when the amount of the fatty acid derivative exceeds 100 ppm in the resin or rubber material. That is, the additive such as the fatty acid derivative is scarcely eluted in some cases depending on the type of the material or depending on the type and the amount of other contained additive or additives even when the material is identical. Accordingly, in order to provide the ink-jet recording apparatus with which the high reliability and the high image quality are stably obtained, it has been found out that the attention should be paid to the amount of the additive such as the fatty acid derivative to be eluted or released from the resin or rubber material into the ink under the actual condition of use, without controlling the concentration and/or the component of the additive such as the fatty acid derivative contained in the resin or rubber material to be used for the ink flow passage. Thus, the present invention has been completed. Further, according to an experiment performed by the inventors, it has been revealed that the elution or the release of the additive such as the fatty acid derivative from the resin or rubber material into the ink appears more remarkably by immersing the resin or rubber material in water for a predetermined period of time under a predetermined condition. When the water immersion method is used, it is possible to conveniently select the material.

DESCRIPTION OF THE PREFERRED EMBODIMENTS

In the ink-jet recording apparatus to which the present invention is directed, at least a part of the ink flow passage is composed of the resin or rubber material. The type of the resin or rubber material, which is usable, is not specifically limited, including, for example, polyolefin resin such as polypropylene resin and polyethylene resin, polyvinyl chloride, polyvinylidene chloride, silicon resin, vinyl acetate copolymer, ABS resin, polyacetal resin, nylon resin, fluorine resin, butyl rubber, butadiene rubber, silicon rubber, urethane rubber, styrene rubber, chloroprene rubber, nitrile rubber, ethylene-propylene rubber, and fluorine rubber. The resin or rubber material as described above may contain the conventionally known additive such as the stabilizer, the ultraviolet-absorbing agent, the antioxidant, and the antistatic agent within a range in which the object of the present invention is not inhibited.

According to the present invention, the resin or rubber material as described above is selected in accordance with the following method. At first, the resin or rubber material as described above is immersed in water heated in the tightly closed vessel for a predetermined period of time. For example, the resin or rubber material may be immersed in water heated to 60° C. for 2 weeks. After the immersion, the amount of eluted matters such as the fatty acid derivative eluted into water is measured. When the fatty acid derivative is measured, the material, for which the measured value is not more than a predetermined amount, especially not more than 20 ppm with respect to the total amount of the resin or rubber material when the material is immersed in water heated to 60° C. for 2 weeks, may be judged to be a preferred material. If the measured value exceeds 20 ppm, then the eluted fatty acid derivative causes the reaction or the like together with the component in the ink, and the discharge failure tends to be caused. Under the immersion condition as described above, the amount of elution of the fatty acid derivative is preferably not more than 18 ppm. The fatty acid derivative can be measured qualitatively and quantitatively, for example, by combining the conventionally known analysis methods such as the FT-IR method, the GC analysis method, and the GC-MS analysis method.

Alternatively, in the method as described above, the ink to be used for the ink-jet recording apparatus may be used in place of water. In this procedure, the resin or rubber material is immersed in the water base ink heated in the tightly closed vessel for a predetermined period of time. For example, the resin or rubber material may be immersed in the water base ink heated to 60° C. for 2 weeks. When the water base ink is used, the result is obtained in conformity with the actual state of use of the ink-jet recording apparatus. However, according to an experiment performed by the inventors, it has been revealed that at least the fatty acid derivative tends to be eluted more promptly when the resin or rubber material is immersed in water than when the resin or rubber material is immersed in the ink. Therefore, when the fatty acid derivative is predominantly measured, it is preferable to use, as the immersing medium, water, especially water having a high purity such as distilled water and pure water.

When the ink is used as the immersing medium, the eluted matters such as the fatty acid derivative can be also measured qualitatively and quantitatively, for example, by combining the conventionally known analysis methods such as the FT-IR method, the GC analysis method, and the GC-MS analysis method as described above. In place of the direct quantitative measurement of the amount of the eluted matters such as the fatty acid derivative, the amount of the eluted matters such as the fatty acid derivative can be conveniently postulated by immersing the resin or rubber material in the ink for 2 weeks, taking out the resin or rubber material from the ink thereafter, and filtrating the ink to measure the filtration time. In this procedure, the filtration time of the ink stored under the immersion condition as described above, which is obtained without immersing the resin or rubber material in the ink, is regarded as the reference value. A predetermined multiple of the reference value is determined as the threshold value. Any material, which exceeds the threshold value, can be regarded to be inappropriate. Alternatively, the ink, which contains a known amount of the additive such as the fatty acid derivative, is previously filtrated to determine the filtration time beforehand. The filtration time can be also used to determine the amount of eluted matters eluted into the ink in which the resin or rubber material has been immersed. That is, a plurality of inks (reference inks), each of which contains the eluted matters (released matters) such as the fatty acid derivative in an amount allowable for each of the resin or rubber materials and the inks, are prepared. Those having filtration times shorter than the filtration time of the reference ink can be judged to be the materials appropriated to construct the ink flow passage. The threshold value and the reference ink as described above can be prescribed for each of the types and the colors of the inks.

In the method of the present invention, the eluted matters, which are eluted (released) into water or the ink during the immersion, include the additives of the resin or rubber material. The additives may include, for example, stabilizers such as stannum compounds, fatty acid calcium salts, and phosphorous acid esters to avoid the qualitative deterioration caused by the heat during the molding; fillers such as glass, silica, and metal powders to improve the heat resistance and the abrasion resistance; ultraviolet-absorbing agents such as 2-hydroxybenzophenone, triazole, and acrylonitrile derivatives to avoid the deterioration of the strength caused by the ultraviolet light; flame retardants such as antimony oxide, barium metaborate, and phosphate esters to improve the flame resistance; plasticizers such as phthalic diesters, dioctyl phthalate, and butanol diesters to adjust the processibility; antioxidants to avoid the deterioration of the strength caused by the air oxidation; antistatic agents such as fatty acid glycerides including, for example, stearic monoglyceride and palmitic monoglyceride to avoid the accumulation of static electricity; coloring agents; mold releasing agents; chlorine-based catalysts for the polymerization; fatty acid derivatives such as calcium stearate to be used as the neutralizing agent for avoiding the mold corrosion; and vulcanization accelerators such as dithiocarbamates.

In another embodiment of the present invention, the production (purification) can be performed by removing the fatty acid derivative or the like by repeating, a plurality of times (about 4 to 6 times), the operation in which the resin or rubber material to be used for the ink flow passage is immersed in a large amount of heated water, for example, water heated to 60° C. for a predetermined period of time, for example, for 3 days.

Figure 1:
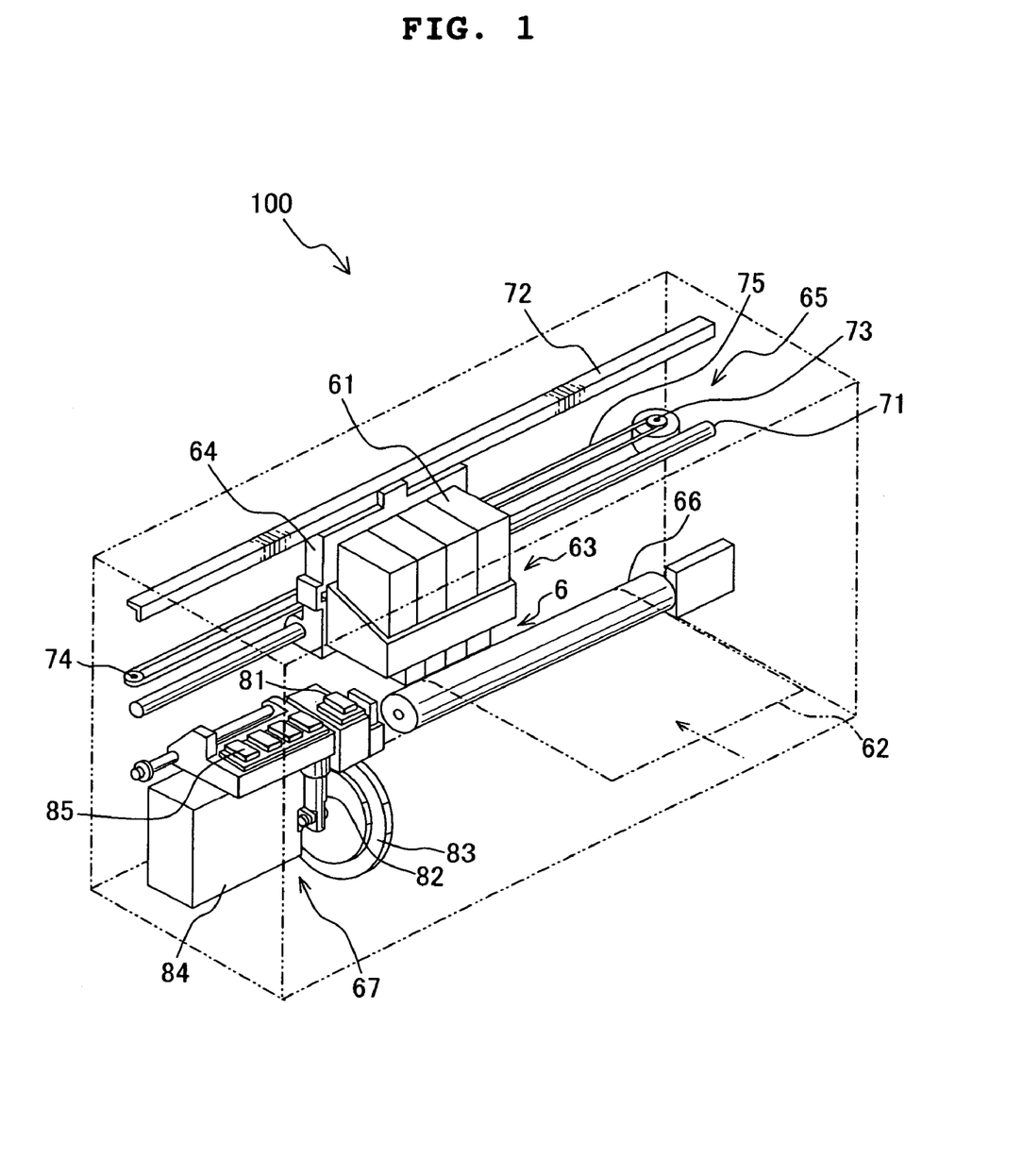
FIG. 1 schematically shows an embodiment of the ink-jet recording apparatus.

FIG. 1 shows a preferred embodiment of the ink-jet recording apparatus to which the present invention is applied. The ink-jet recording apparatus 100 shown in FIG. 1 comprises four ink cartridges 61 which include respective colors of, for example, black, yellow, magenta, and cyan inks respectively, a head unit 63 which includes a head 6 for discharging ink droplets onto printing paper 62, a carriage 64 on which the ink cartridges 61 and the head unit 63 are provided, a drive unit 65 which reciprocates the carriage 64 in the linear direction, a platen roller 66 which extends in the direction of the reciprocating motion of the carriage 64 and which is arranged opposingly to the head 6, and a purge unit 67.

The drive unit 65 includes a carriage shaft 71, a guide plate 72, two pulleys 73, 74, and an endless belt 75. In this arrangement, the carriage shaft 71 and the guide plate 72 extend in parallel to the platen roller 66 to slidably support the carriage 64. The endless belt 75 is stretched between the pulleys 73, 74. When the pulley 73 is rotated in the positive direction and the opposite direction, the carriage 64, which is connected to the endless belt 75, makes the reciprocating motion in the linear direction along the carriage shaft 71 and the guide plate 72 in accordance with the positive rotation and the opposite rotation of the pulley 73.

The printing paper 62 is supplied from a printing paper cassette (not shown) which is connected to the ink-jet recording apparatus 100. The printing paper 62 is fed into the space between the head 6 and the platen roller 66. The programmed printing is carried out thereon with the ink droplets discharged from the head 6. After that, the printing paper 62 is discharged to the outside. The printing paper supply function and the printing paper discharge function are not shown in FIG. 1.

The purge unit 67 is installed on one side of the platen roller 66. The purge unit 67 includes a purge cap 81, a pump 82, a cam 83, and a drain ink reservoir 84. When the head unit 63 is placed at the position opposed to the purge cap 81, then the purge cap 81 is moved upwardly by the cam 83 to make contact with the nozzle surface of the head 6, and a plurality of nozzles formed in the head 6 are covered therewith. The ink contained in the head 6 is sucked by the pump 82, and thus any ink having the increased viscosity and bubbles are discharged from the inside of the head 6. The sucked ink is stored in the drain ink reservoir 84. The cap 85 is installed in order to prevent the ink from being dried. When the carriage 64 is returned to the reset position after the printing, the cap 85 covers the nozzles 15 (FIG. 2) of the head 6 provided on the carriage 64.

Figure 2:
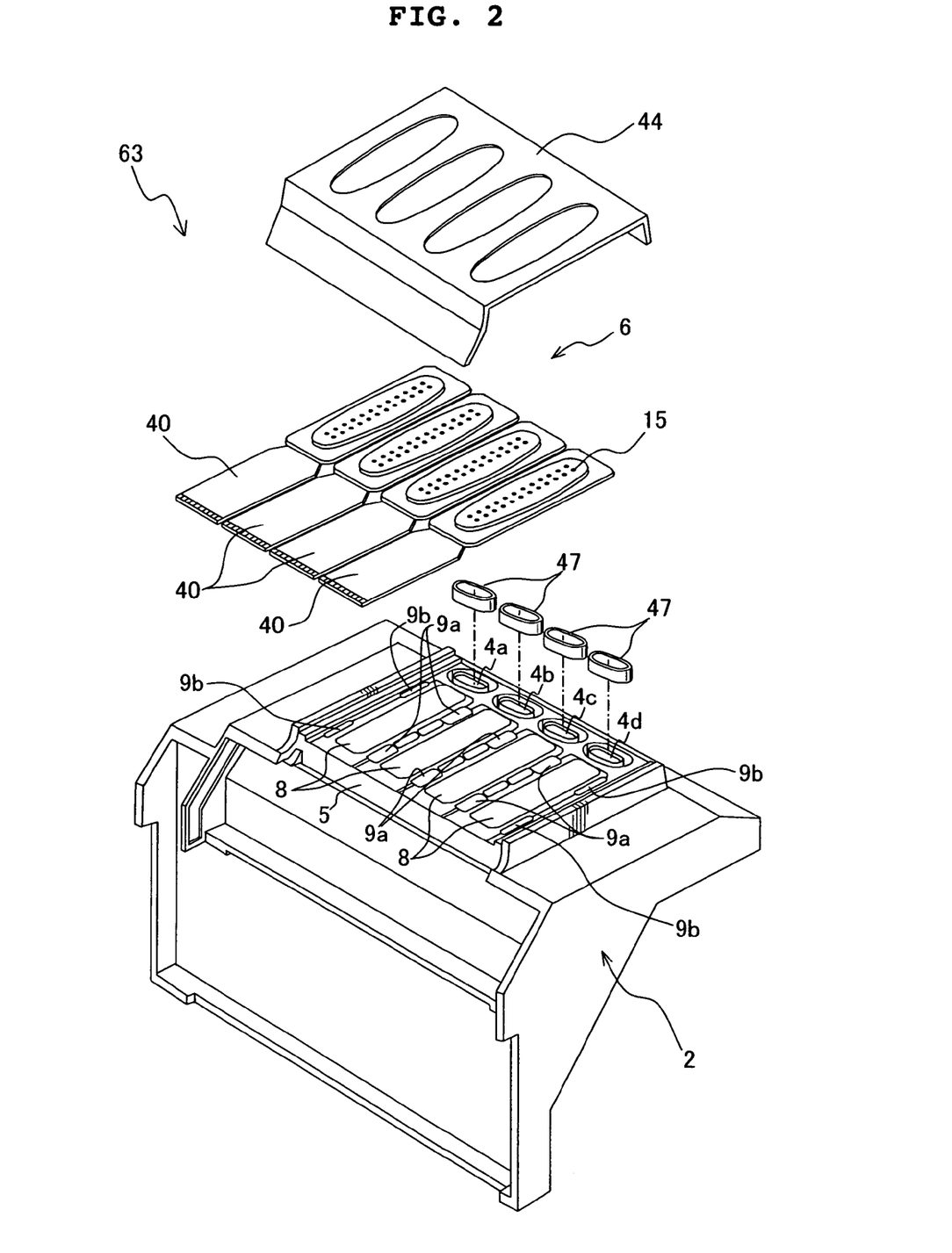
FIG. 2 schematically shows and explains a head unit.

FIG. 2 schematically shows and explains the head unit 63. The head unit 63 shown in FIG. 2 is depicted upside down with respect to the state shown in FIG. 1. As shown in FIG. 2, the head unit 63 is connected to the carriage 64 which is movable along the printing paper 62. The head unit 63 substantially has a box-shaped structure in which the upper portion is open in the state shown in FIG. 1. The head unit 63 has a cover plate 44 which is made of a metal plate. The cover plate 44 is fixed to the side of the ink discharge surface of the head unit 63 to cover the head 6. The head unit 63 has a mount section 2 to which the four ink cartridges 61 are detachably attached from the upper positions in the state shown in FIG. 1. Respective ink supply passages 4a, 4b, 4c, 4d are connected to the respective ink discharge sections of the respective ink cartridges 61 to make communication with the bottom of the bottom plate 5 of the head unit 63. Rubber packings 47 are provided for the ink supply passages 4a, 4b, 4c, 4d to make tight contact with the head 6 respectively.

The head 6 is composed of four blocks which are arranged in parallel to one another. The respective blocks of the head 6 are supported on the lower side (lower side in FIG. 2) of the bottom plate 5. In the bottom plate 5, an ultraviolet-curable adhesive is charged to a plurality of recesses 9a, 9b to bond the respective blocks of the head 6. The recesses 9a, 9b are formed to penetrate through the bottom plate 5.

Figure 3:
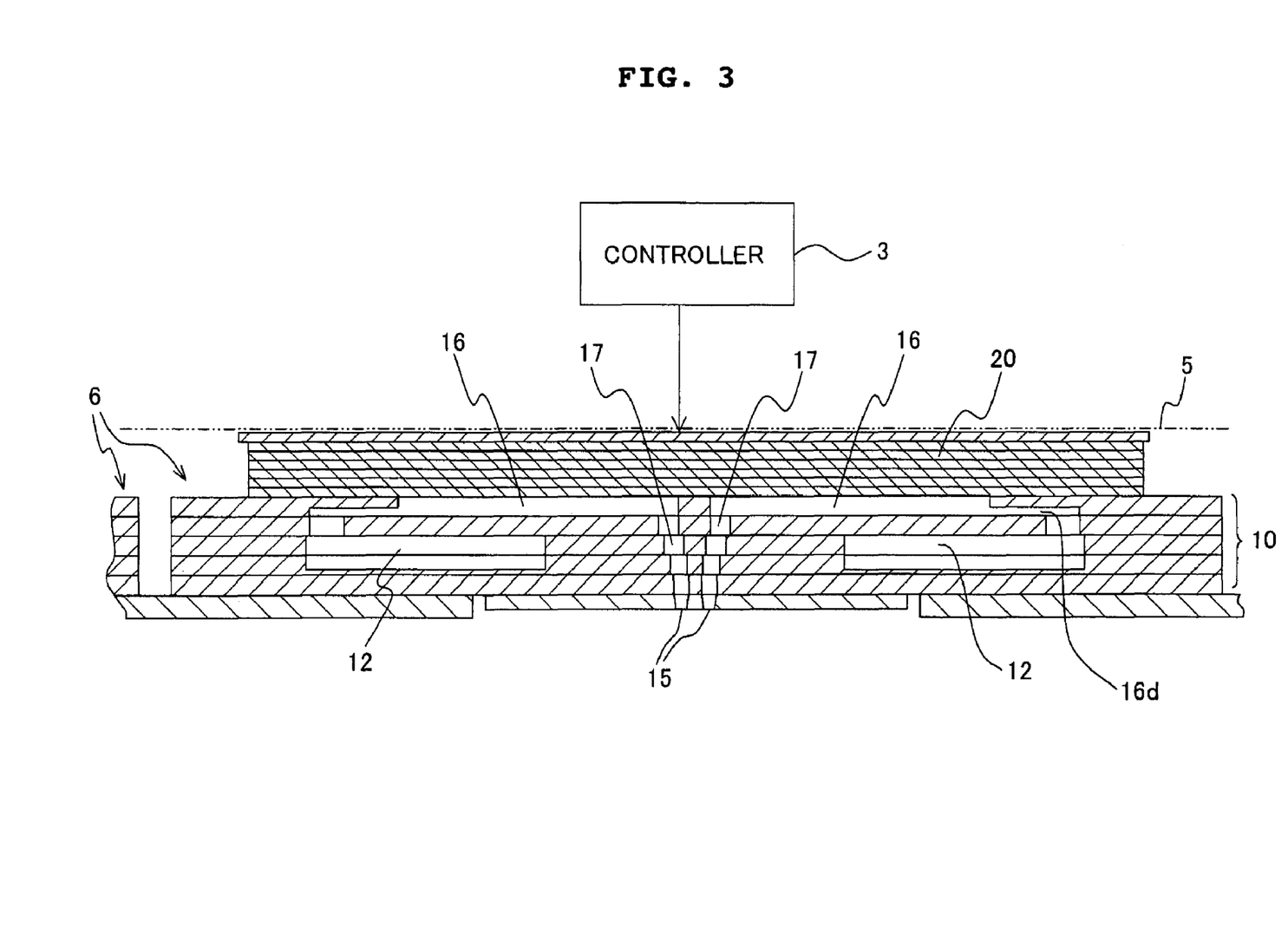
FIG. 3 shows a sectional view illustrating one of pressure chambers disposed in a head.

A plurality of pressure chambers 16 are formed in the head 6. FIG. 3 shows a sectional view illustrating one of the pressure chambers in the head 6. The plurality of nozzles 15, which are communicated with each of the pressure chambers 16 respectively, are provided approximately in one array on one surface of the head 6. The head 6 is composed of a cavity plate 10 and a piezoelectric actuator 20. The cavity plate 10 has a manifold 12 connected to the ink supply passage 4a, 4b, 4c, 4d, a narrow section 16d, the pressure chamber 16, path holes 17, and the nozzles 15, and these components are communicated with each other. The controller 3 applies the driving pulse to the piezoelectric actuator 20 in synchronization with the clock signal. The driving pulse can be controlled, for example, in accordance with a technique disclosed in U.S. Pat. Nos. 6,312,089, 6,412,923, or 6,460,959. Further, the detailed structure of the recording apparatus and the method for controlling the head unit are disclosed in these United States Patents. The disclosure of the contents of these United States Patents is incorporated herein by reference.

As for the ink-jet recording apparatus 100 shown in FIGS. 1 to 3, the ink flow passage includes the cartridge 61, the ink supply passages 4a, 4b, 4c, 4d, the rubber packing 47, the head 6, and the cap 85. However, in general, a material other than the resin or rubber material is used for the head 6. In the case of ink-jet recording apparatuses having other structures, as described, for example, in U.S. 2003/0107625 A1, the ink flow passage from the cartridge to the head is occasionally composed of a flexible tube formed of a resin or rubber material. The resin or rubber material, which is selected in accordance with the present invention, can be used for such a flexible tube. The contents of the disclosure of U.S. 2003/0107625 A1 is incorporated herein by reference.

The ink, which is usable for the ink-jet recording apparatus to which the present invention is applicable, is not especially limited. However, the present invention is especially effective when a water base ink for ink-jet recording containing water by not less than 50% by weight is used. The water base ink for ink-jet recording contains, for example, a coloring agent, a moistening agent, and an organic solvent to serve as a permeating agent. If necessary, the water base ink for ink-jet recording may further contain, for example, a pH-adjusting agent, a metal-sequestering agent, a viscosity-adjusting agent, a surface tension-adjusting agent, a moistening agent, a specific resistance-adjusting agent, a film-forming agent, an ultraviolet-absorbing agent, an antioxidant, an antifading agent, a rustproofing agent, a resin binder, a surfactant, a dye-dissolving agent, and an antiseptic/fungicidal agent. Further, when the ink-jet recording apparatus is of the type in which the ink is discharged in accordance with the action of the thermal energy, it is also allowable to adjust thermal physical property values (for example, specific heat, coefficient of thermal expansion, and coefficient of thermal conductivity).

EXAMPLES

The present invention will be explained in further detail below as exemplified by Examples. However, the present invention is not limited to only Examples.

Example 1

In order to manufacture an ink-jet recording apparatus having a structure as shown in FIG. 1, respective materials shown in Table 1 were prepared as materials for constructing the ink flow passage. Each of the materials was cut into a test piece having a size of about 50 mm×10 mm×2 mm. Each of the test pieces was immersed in distilled water in a tightly closed vessel, and the temperature of distilled water was adjusted to 60° C. by using a thermostatic chamber. The gas phase in the tightly closed vessel was air. The vessel was retained under this temperature condition for 2 weeks. After 2 weeks, the test piece was taken out from the vessel. Fatty acid components (fatty acid derivatives), which were eluted from the liquid remained in the vessel, were extracted with diethyl ether. The fatty acid components in the obtained extracted liquid were converted into trimethylsilyl derivatives which were thereafter measured by the GC-MS analysis method. Obtained results are shown in Table 1. In Table 1, the weight of the fatty acid derivative is represented by the weight ratio (ppm) of the eluted fatty acid derivative with respect to the test piece.

TABLE 1

| Part | Material | Amount of fatty acid derivative (ppm) |
|---|---|---|
| Cartridge 61 | Polypropylene resin | 10 |
| Ink supply passage 4a, 4b, 4c, 4d | Acrylonitrile-butadiene-styrene copolymer resin | 15 |
| Rubber packing 47 | Silicone rubber | 5 |
| Cap 85 | Silicone rubber | 5 |

Example 2

Materials were immersed in distilled water under the same condition as that in Example 1 except that the materials shown in Table 2 were used, and the amounts of fatty acid derivatives eluted from the respective materials were measured.

TABLE 2

| Part | Material | Amount of fatty acid derivative (ppm) |
|---|---|---|
| Cartridge 61 | Polypropylene resin | 18 |
| Ink supply passage 4a, 4b, 4c, 4d | Polyacetal resin | 14 |
| Rubber packing 47 | Fluoro rubber | not detected |
| Cap 85 | Butyl rubber | 7 |

Comparative Example 1

Materials were immersed in distilled water under the same condition as that in Example 1 except that the materials shown in Table 3 were used, and the amounts of fatty acid derivatives eluted from the respective materials were measured. The respective materials used in Comparative Example 1 were of the same types as those in Example 1, but the grades differed.

TABLE 3

| Part | Material | Amount of fatty acid derivative (ppm) |
|---|---|---|
| Cartridge 61 | Polypropylene resin | 40 |
| Ink supply passage 4a, 4b, 4c, 4d | Acrylonitrile-butadiene-styrene copolymer resin | 35 |
| Rubber packing 47 | Silicone rubber | 33 |
| Cap 85 | Silicone rubber | 33 |

Comparative Example 2

Materials were immersed in distilled water under the same condition as that in Example 1 except that the materials shown in Table 4 were used, and the amounts of fatty acid derivatives eluted from the respective materials were measured. The respective materials used in Comparative Example 2 were of the same types as those in Example 2, but the grades differed.

TABLE 4

| Part | Material | Amount of fatty acid derivative (ppm) |
|---|---|---|
| Cartridge 61 | Polypropylene resin | 70 |
| Ink supply passage 4a, 4b, 4c, 4d | Polyacetal resin | 40 |
| Rubber packing 47 | Fluoro rubber | not detected |
| Cap 85 | Butyl rubber | 25 |

Production of Ink-jet Recording Apparatus

The ink flow passages as shown in FIGS. 2 and 3 were constructed by using the materials of Examples 1 and 2 and Comparative Examples 1 and 2 to assemble the ink-jet recording apparatus shown in FIG. 1.

Evaluation

The water base ink compositions of the respective colors shown in Table 5 were mixed and agitated respectively, followed by being filtrated through a membrane filter of 0.2 μm to prepare the inks of the respective colors. The obtained inks were used to evaluate the jetting performance in accordance with the following procedure for each of the ink-jet recording apparatuses manufactured by using the materials of Examples 1 and 2 and Comparative Examples 1 and 2 as the materials for the ink flow passages.

(1) The ink cartridge is attached to the ink-jet recording apparatus, and the inks are introduced into the flow passages.
(2) The test printing is performed to confirm that the inks are jetted from all of the nozzles.
(3) The ink-jet recording apparatus is left to stand for 2 weeks in an environment at 40° C. (humidity is not adjusted).
(4) The temperature is returned to room temperature, and then the ink-jet recording apparatus is further left to stand for 1 week.
(5) The purge operation and the test printing are repeated.

The discharge of the ink, which was achieved in this situation, was used to make the evaluation in accordance with the following criteria.

+: the discharge was restored from all of the nozzles by the purge operation performed not more than five times.
±: the discharge was restored from all of the nozzles by the purge operation performed six to ten times.
−: the discharge was not restored from all of the nozzles even by the purge operation performed not less than eleven times.

Obtained results are shown in Table 6.

TABLE 5

| | Composition (parts by weight) | | | |
|---|---|---|---|---|
| Ink material | Yellow | Magenta | Cyan | Black |
| Glycerol | 25.0 | 20.0 | 25.0 | 25.0 |
| Triethylene glycol monobutyl ether | 6.0 | 6.0 | 8.0 | 7.0 |
| Antiseptic agent (Proxel XL-2 produced by Avecia) | 0.2 | 0.2 | 0.2 | 0.5 |
| C.I. Acid Yellow 23 | 1.2 | — | — | — |
| C.I. Acid Red 52 | — | 1.4 | — | — |
| C.I. Acid Blue 9 | — | — | 2.0 | — |
| Carbon black (CAB-O-JET 300) | — | — | — | 30.0 |
| Distilled water | 67.5 | 72.4 | 64.8 | 37.5 |

TABLE 6

| | Evaluation of jetting performance |
|---|---|
| Example 1 | + |
| Example 2 | + |
| Comparative Example 1 | ± |
| Comparative Example 2 | − |

Example 3

A plurality of test pieces were prepared, each of which was composed of a rubber material containing butyl rubber, carbon black, and silicone oil at a weight ratio of butyl rubber: carbon black: silicone oil=100:50:20. Of these test pieces, the test pieces #1 to #3 contain, as a vulcanization accelerator, zinc diethyl dithiocarbamate (EZ) as represented by the following formula (1) at ratios (% by weight) shown in Table 7 respectively. The test pieces #4 and #5 contain, as a vulcanization accelerator, tetramethyl thiuram disulfide (TT) as represented by the following formula (2) at ratios (% by weight) shown in Table 7 respectively. The test piece #6 contains, as vulcanization accelerators, tetramethyl thiuram disulfide (TT) and benzothiazyl disulfide (DM) as represented by the following formula (3) at ratios (% by weight) shown in Table 7 respectively.

(1)

-continued $$(CH_3)_2 \underset{\underset{S}{\|}}{N}C-S-S-C\underset{\underset{S}{\|}}{N}(CH_3)_2 \qquad (2)$$

(3)

The test pieces #1 to #6 were immersed in the black inks contained in the tightly closed vessels respectively, and the temperature was kept and maintained for 2 weeks at 60° C. by using the thermostatic chamber. A space was provided over the black ink contained in the tightly closed vessel. The air (gas phase) was present in the space. The ink composition was the same as the composition of the black ink described in Table 5. After that, the respective black inks were filtrated through an electroforming filter having a pore diameter of 13 μm. It was revealed that the time required for the filtration differed depending on the black inks in which the respective test pieces #1 to #6 were immersed. For the purpose of comparison, only the black ink, to which any test piece was not added, was stored under the same condition as that described above to determine the time (reference time) required for the filtration with the same filter. The percentages of the times required for the filtration of the inks in which the respective test pieces #1 to #6 were immersed, with respect to the reference time were determined, which are shown in Table 7. The eluted matters, which were filtrated with the filter, were identified by FT-IR. It was revealed that the eluted matters were principally fatty acid components and the vulcanization accelerators represented by the foregoing formulas (1) to (3). According to the results of FT-IR, it was revealed that as the time required for the filtration was longer, the amount of the eluted matters eluted into the ink became larger. As described above, the filtration time is the reference to indicate the amount of the eluted matters. Therefore, the amount of the eluted matters can be conveniently evaluated by measuring the filtration time.

which the respective test pieces were immersed, were evaluated in accordance with the following judgment criteria.

Ink required the filtration time less than 130% of the reference time: ++;

Ink required the filtration time not less than 130% and less than 200% of the reference time: +;

Ink required the filtration time not less than 200% and less than 400% of the reference time: ±;

Ink required the filtration time not less than 400% of the reference time: ±.

Ink flow passages as shown in FIGS. 2 and 3 are constructed by using the respective materials of Example 3 to assemble ink-jet recording apparatuses as shown in FIG. 1. The evaluation is made about the jetting performance in the same manner as described above. In this case, it is expected that the obtained evaluation about the jetting performance is more satisfactory for the ink-jet recording apparatus in which the ink flow passage is constructed with the material which has obtained the evaluation of less than 200% in Example 3, than for the ink-jet recording apparatus in which the ink flow passage is constructed with the material which has obtained the evaluation of not less than 200%. It is affirmed that the ink, which is within a range not exceeding 200% of the reference time, is satisfactory. It is appreciated that the ink, which satisfies the satisfactory evaluation, differs depending on the color of the ink as well. According to the result shown in Table 7, it is also appreciated that the amount of elution of eluted matters is larger for the material which contains zinc diethyl dithiocarbamate (EZ) as the vulcanization accelerator, than for the materials which contain other vulcanization accelerators. Therefore, one of the references to select the material for the ink flow passage may be whether or not the material contains zinc diethyl dithiocarbamate (EZ). In any case, it is appreciated that the clog-up of nozzles or the like of the ink-jet head can be suppressed or avoided by selecting the material with which the ratio of the filtration time of the ink with respect to the reference time is reduced to the predetermined value, i.e., the material with which the amount of elution is reduced to

TABLE 7

| Test piece # | Vulcanization accelerator in rubber material (% by weight) | Result of evaluation about filtration on the basis of immersing liquid (%) | | | | |
|---|---|---|---|---|---|---|
| | | Black ink | Yellow ink | Magenta ink | Cyan ink | Average value |
| #1 | EZ = 0.5% | 262 ± | 177 + | 624 − | 228 ± | 322.75 ± |
| #2 | EZ = 0.4% | 133 + | 352 ± | 1220 − | 157 + | 465.5 − |
| #3 | EZ = 0.3% | 140 + | 226 ± | 1703 − | 145 + | 553.5 − |
| #4 | TT = 0.3% | 167 + | 199 + | 301 ± | 115 ++ | 195.5 + |
| #5 | TT = 0.4% | 124 ++ | 149 + | 368 ± | 115 ++ | 189 + |
| #6 | TT = 0.4% DM = 0.1% | 99 ++ | 150 + | 356 ± | 101 ++ | 176.5 + |

The test pieces #1 to #6, which were separately prepared, were immersed in the yellow, magenta, and cyan inks respectively under the same immersion condition as that described above, followed by being filtrated. The time, which was required for the filtration performed in the same manner as described above, is shown in Table 7 as the percentage with respect to the filtration time (reference time) of the ink in which no test piece was immersed. The inks, in the predetermined amount, on the basis of the results of Examples and Comparative Examples described above.

According to the present invention, the material for the ink flow passage, which is optimum for the actual condition of use, can be selected by the convenient method without investigating the components and the composition of each of the materials. When the material, which is selected by the method as described above, is used, it is possible to reduce the foreign matters such as fatty acid derivatives which would be otherwise eluted into the ink charged to the ink-jet recording apparatus. Therefore, it is possible to provide the ink-jet recording apparatus which stably provides the high reliability and the high image quality.

What is claimed is:

1. A method for selecting a resin material to be used for at least a part of an ink flow passage of an ink-jet recording apparatus, the method comprising:

immersing a resin material material in one of a heated water and a heated ink to be used for the ink-jet recording apparatus, for a predetermined period of time in a tightly closed vessel;

determining an amount of eluted matters eluted into the one of the water and the ink after the immersing of the resin material; and judging whether the resin material is appropriate as a material to be used for at least the part of the ink flow passage of the ink-jet recording apparatus on the basis of the determined amount of the eluted matters, whereby the resin material to be used for at least the part of the ink flow passage of the ink-jet recording apparatus is selected.

2. The method for selecting the resin material according to claim 1, wherein judging whether the resin material is appropriate as the material to be used for at least the part of the ink flow passage of the ink-jet recording apparatus only when the determined amount of the eluted matters is not more than a predetermined amount.

3. The method for selecting the resin material according to claim 1, wherein the eluted matters include fatty acid derivative.

4. The method for selecting the resin material according to claim 1, wherein judging whether the resin material is appropriate as the material to be used for at least the part of the ink flow passage of the ink-jet recording apparatus if an amount of fatty acid derivative, which is eluted when the resin material is immersed in the water at 60° C. for 2 weeks in the tightly closed vessel, is not more than 20 ppm with respect to a total amount of the resin material.

5. The method for selecting the resin material according to claim 1, wherein the material is immersed in the ink at 60° C. for 2 weeks in the tightly closed vessel, the ink after the immersion is filtrated to determine a filtration time, and the amount of the eluted matters eluted into the ink is determined on the basis of the filtration time.

6. The method for selecting the resin material according to claim 5, wherein the ink is retained at 60° C. for 2 weeks in the tightly closed vessel without immersing the resin material, a reference filtration time is subsequently determined by filtrating the ink, and the amount of the eluted matters eluted into the ink is determined by comparing the reference filtration time with the filtration time obtained when the resin material is immersed in the ink.

7. The method for selecting the resin material according to claim 1, wherein the ink flow passage includes at least one of an ink cartridge, an ink supply passage, a rubber packing, a head, a cap, and an ink supply tube.

8. A method for selecting a rubber material to be used for at least a part of an ink flow passage of an ink-jet recording apparatus, the method comprising:

immersing a rubber material in one of a heated water and a heated ink to be used for the ink-jet recording apparatus, for a predetermined period of time in a tightly closed vessel;

determining an amount of eluted matters eluted into the one of the water and the ink after the immersing of the rubber material; and judging whether the rubber material is appropriate as a material to be used for at least the part of the ink flow passage of the ink-jet recording apparatus on the basis of the determined amount of the eluted matters, whereby the rubber material to be used for at least the part of the ink flow passage of the ink-jet recording apparatus is selected.

9. The method for selecting the rubber material according to claim 8, wherein judging whether the rubber material is appropriate as the material to be used for at least the part of the ink flow passage of the ink-jet recording apparatus only when the determined amount of the eluted matters is not more than a predetermined amount.

10. The method for selecting the rubber material according to claim 8, wherein the eluted matters include fatty acid derivative.

11. The method for selecting the rubber material according to claim 8, wherein judging whether the rubber material is appropriate as the material to be used for at least the part of the ink flow passage of the ink-jet recording apparatus if an amount of fatty acid derivative, which is eluted when the rubber material is immersed in the water at 60° C. for 2 weeks in the tightly closed vessel, is not more than 20 ppm with respect to a total amount of the rubber material.

12. The method for selecting the rubber material according to claim 8, wherein the rubber material is immersed in the ink at 60° C. for 2 weeks in the tightly closed vessel, the ink after the immersion is filtrated to determine a filtration time, and the amount of the eluted matters eluted into the ink is determined on the basis of the filtration time.

13. The method for selecting the rubber material according to claim 12, wherein the ink is retained at 60° C. for 2 weeks in the tightly closed vessel without immersing the rubber material, a reference filtration time is subsequently determined by filtrating the ink, and the amount of the eluted matters eluted into the ink is determined by comparing the reference filtration time with the filtration time obtained when the rubber material is immersed in the ink.

14. The method for selecting the rubber material according to claim 8, wherein the ink flow passage includes at least one of an ink cartridge, an ink supply passage, a rubber packing, a head, a cap, and an ink supply tube.

* * * * *

UNITED STATES PATENT AND TRADEMARK OFFICE
CERTIFICATE OF CORRECTION

| | | |
|---|---|---|
| PATENT NO. | : 7,146,728 B2 | |
| APPLICATION NO. | : 10/946124 | |
| DATED | : December 12, 2006 | |
| INVENTOR(S) | : Masashi Tsuda and Noriaki Satoh | |

It is certified that error appears in the above-identified patent and that said Letters Patent is hereby corrected as shown below:

On the title page:

Item (75), please change "Masashi Tsuda, Aichi-ken (JP)" to

--Masashi Tsuda, Haguri-gun (JP)--

Column 13, beginning at line 40, please replace claim 5 with the following claim:

5. The method for selecting the resin material according to claim 1, wherein the resin material is immersed in the ink at 60 °C for 2 weeks in the tightly closed vessel, the ink after the immersion is filtrated to determine a filtration time, and the amount of the eluted matters eluted into the ink is determined on the basis of the filtration time.

Signed and Sealed this

Twelfth Day of February, 2008

JON W. DUDAS
*Director of the United States Patent and Trademark Office*